Patented Nov. 15, 1927.

1,649,685

UNITED STATES PATENT OFFICE.

ALBERT W. HAHN AND CHARLES M. NOKES, OF SALT LAKE CITY, UTAH.

FLOTATION PROCESS.

No Drawing.  Application filed April 10, 1925. Serial No. 22,184.

This invention relates to the concentration of ores by flotation, and more particularly to the selective or preferential flotation of so-called refractory or mixed sulphide ores containing, for example, sulphide of iron and one or more metallic sulphides such as, for example, lead, and zinc sulphides, together with appreciable amounts of gold and silver.

This invention provides an improved method of treating a complex sulphide ore containing iron sulphide together with either lead or zinc sulphides, or both, whereby the major portion of the iron sulphide mineral is left behind in the tailings, while the more valuable metallic sulphides are recovered in the flotation froths.

The invention is based upon the discovery that zinc sulphide minerals can be selectively floated from iron sulphide minerals in a pulp to which alkalies, such as sodium carbonate and sodium bicarbonate, or cyanides, such as sodium or potassium cyanides, have been added to inhibit the flotation of zinc and iron sulphides, by the addition of aluminum sulphate in relatively small amounts, and then subjecting the pulp to froth flotation, whereby a froth high in zinc sulphide and relatively low in iron sulphide is removed, the bulk of the iron sulphide remaining in the tailings. It is, of course, understood that some type of flotation oil, or oils, must be used in connection with these addition agents.

We are familiar with flotation processes using alkaline cyanides and alkaline carbonates for the purpose of depressing both iron and zinc sulphides, in order to separate them from lead and other sulphides, in which processes copper sulphate is then added to the remaining pulp, after removal of sulphides other than zinc and iron, to raise the zinc sulphides. With our method, in an ore containing, for example, zinc, lead and iron sulphides, sodium cyanide is first added to the pulp, together with flotation oils, and a concentrate removed containing the major portion of the lead sulphide. To the remaining pulp is added a relatively small quantity of aluminum sulphate, and a zinc sulphide concentrate is removed, the bulk of the iron sulphide mineral remaining in the residue or tailing. This method may be carried out in a pulp alkaline with sodium carbonate or sodium bicarbonate, or in a pulp containing none of these ingredients, but which does contain a soluble cyanide, such as sodium or potassium cyanide.

With our method we have eliminated the use of copper sulphate, for which we have substituted a reagent much lower in cost and which has none of the inherent disadvantages of copper sulphate, such as the corrosion of apparatus and piping, due to galvanic action.

Aluminum sulphate also has additional advantages in that very small amounts of alkalies are necessary, thereby reducing the quantities of flotation oils usually required when floating sulphide minerals from an alkaline pulp.

It is readily seen that, in an ore containing no lead sulphide minerals, but containing zinc and iron sulphides, our reagent can be used by adding to the ore pulp, either at the grinding stage or in the flotation machine, a small amount of soluble cyanide or soluble alkali, together with the necessary oils and a small amount of aluminum sulphate and a concentrate removed carrying the bulk of the contained zinc sulphide mineral and rejecting the major portion of the contained iron sulphide mineral. We prefer to add the cyanide or alkali and a portion of the flotation oils or reagents at the grinding mill, and the aluminum sulphate at the flotation machine, where additional oil is also added. In our own work we have used an oily reagent.

The primary zinc concentrate may contain a relatively low percentage of zinc and a relatively high percentage of iron, but by merely retreating this concentrate in a flotation machine, a finished concentrate can be produced without the further addition of oils or aluminum sulphate, which will grade as high as forty-eight percent (48%) zinc and quite low in iron.

If desirable, the tailings from the flotation machine, containing the bulk of the iron, can be treated so as to concentrate the iron, merely by the addition of sodium sulphide and a small amount of a suitable flotation oil.

The quantity of aluminum sulphate required to effect the separation of zinc sulphide from iron sulphide will vary. In our work we have found that in no instance was more than four pounds of aluminum sulphate required per ton of ore treated.

Most "complex" sulphide ores contain, in addition to the zinc and iron sulphide minerals, lead, and other sulphides and gold and silver. We prefer to treat these ores according to our invention, as follows:

A cyanide, such as sodium cyanide, and flotation agents are added to the ore in the fine grinding mill, the density of the ore pulp being about one part water to one part solids. The thoroughly ground ore pulp then passes to flotation at a density of four to one. Additional flotation oils may be added at the flotation machines, if found necessary. A concentrate is removed, containing the major portion of the gold, silver, and lead minerals. The remaining pulp, containing the bulk of the zinc and iron sulphide minerals, and any oxidized silver and lead minerals, is then treated with aluminum sulphate and additional flotation agents, and subjected to flotation, and a zinc concentrate removed, as previously described. The remaining pulp from this operation, containing the bulk of the iron sulphides, and any oxidized silver and lead minerals, which may have been present in the original ore, may then be treated with a sulphidizing agent, such as sodium sulphide, and additional flotation oils, if necessary, and subjected to flotation, and an iron sulphide concentrate removed, containing the bulk of the iron sulphide minerals, together with the valuable oxidized minerals.

The following are examples of the practical application of our invention:

Example No. 1.

500 grams of sulphide ore from Idaho, having the following composition—Au .039 oz., Ag 28.4 oz., Pb 8.12%, Zn 5.8%, Fe 16.68%, insol. 38.2%—were ground in a ball mill with 500 cc. water and KCN, equivalent to one-half pound per ton of ore, 0.3 lbs. flotation oil, for twenty minutes. The pulp was then placed in a flotation machine, diluted with water to a ratio of one part of solids to four and a half parts water and a one-tenth pound of flotation oil added, and a lead concentrate removed. To the remaining pulp in the machine, was added the equivalent of four pounds of commercial aluminum sulphate per ton of original ore and six-tenths of a pound of flotation oil, and a zinc concentrate removed.

Both lead and zinc concentrates were re-cleaned and assayed, lead concentrate—Au 0.20 oz., Ag 175.5 oz., Pb 59.4%, Zn 3.8%, Fe 6.3%, and insol. 4.6%—the zinc concentrate assayed Au 0.05 oz., Ag 27 oz., Pb 2.0%, Zn 40.7%, Fe 11.2%, insol. 3.4%. Twenty-two percent of the iron in the ore was discarded in the tailings.

Example No. 2.

500 grams of lead-zinc sulphide ore from Colorado, assaying Au 0.007 oz., Ag 3.08 oz., Pb 6.30%, Zn 12.8%, Fe 27.9%, insol. 6% were ground in a tube mill with 500 cc. of water and the equivalent of ½ lb. of KCN, ⅕ lb. flotation oil and ⅛ lb. reconstructed Yarmor pine oil, per ton of ore, for twenty minutes. The pulp was then placed in a flotation machine, diluted with water to a ratio of one part of solids to four and a half parts water and at intervals additional flotation oil was added up to $\frac{1}{10}$ lbs. per ton of ore and additional reconstructed Yarmor pine oil up to ⅛ lbs. per ton of ore. A lead concentrate was removed during this period and cleaned twice, which assayed—Au 0.06 oz., Ag 17.1 oz., Pb 42.1%, Zn 8.7%, Fe 18.2%, insol. 0.2%. To the remaining pulp in the flotation machine was added four pounds aluminum sulphate, $\frac{1}{10}$ lbs. No. 70 flotation oil and ⅛ lbs. reconstructed Yarmor pine oil per ton of original ore, and a zinc concentrate removed which was cleaned twice and which then assayed—Au trace, Ag 2.0 oz., Pb 1.1%, Zn 48.30%, Fe 10.80%, insol. 1.2%.

The tailings, containing 80% of the iron present in the original ore, assayed—Au trace, Ag 0.8 oz., Pb 1.8%, Zn 4.30%, Fe 34%.

We confine ourselves to no theory as to the action of the addition agents. Our results do show that the percentages of gold, silver and lead in the lead concentrate, using only a cyanide and no alkalies, are higher than those usually obtained by other methods, and the separation of zinc sulphides from iron sulphide, using aluminum sulphate is extremely efficient.

It will be understood that we do not limit ourselves to the treatment of sulphide ores only, as our method may be used for the separation of mixed concentrates obtained by tabling, jigging or flotation, by further treatment as indicated. Also, we do not intend to limit ourselves as to the procedures as shown in the examples or subject matter.

The method is applicable not only to the selective separation of lead and iron sulphides by flotation, but also to the selective separation of other sulphides from iron sulphide.

We claim:

1. The method of effecting a preferential flotation of sulphide minerals from pyrite which comprises subjecting a pulp of such minerals, and containing small amounts of aluminum sulphate and a cyanide of an alkali metal to a froth flotation operation.

2. In a preferential separation process, the steps of treating a pulp containing pyrite and other sulphide minerals, with a cyanide capable of inhibiting the flotation of the pyrite, adding aluminum sulphate and subjecting the pulp to a froth flotation operation.

3. The method of effecting a selective flotation of minerals from an ore containing iron sulphide, zinc sulphide, and lead and its associated sulphides, which comprises: (1) grinding said ore with a cyanide in a liquid; (2) subjecting the pulp resulting from step (1) to flotation and removing a concentrate containing the lead and associated sulphides; (3) adding aluminum sulphate to the pulp resulting from step (2); (4) subjecting the pulp resulting from step (3) to froth flotation; and obtaining thereby a concentrate containing the zinc sulphide and a residual pulp containing the iron sulphide.

In testimony whereof we affix our signatures.

ALBERT W. HAHN.
CHARLES M. NOKES.